April 19, 1966 K. V. KORDESCH 3,247,452
GAS SENSING DEVICE WITH A GAS-DEPOLARIZABLE ELECTRODE
Filed April 10, 1964 2 Sheets-Sheet 1
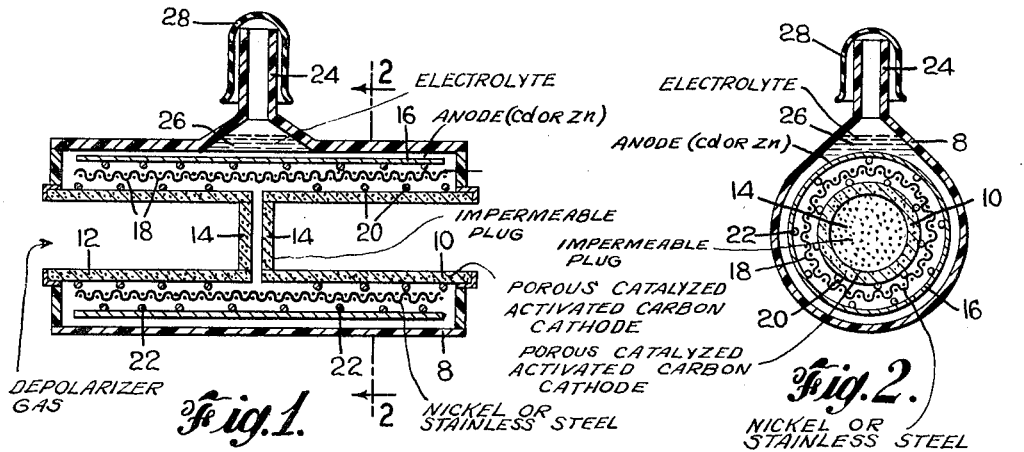
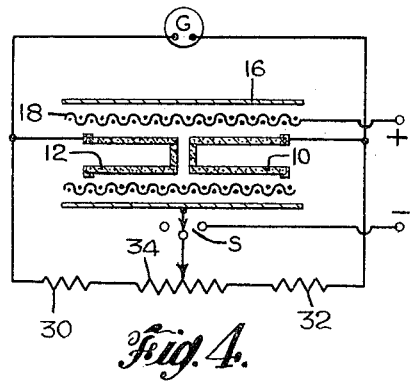
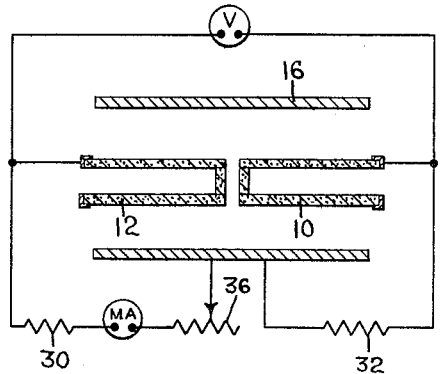
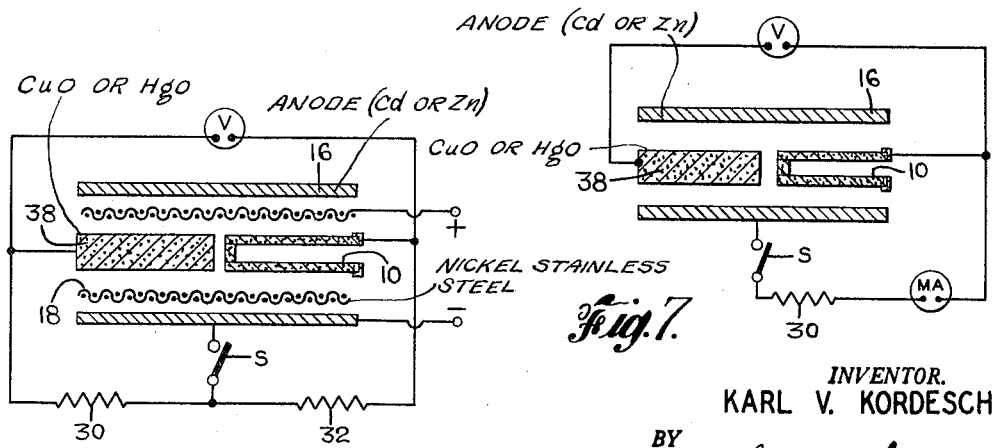
INVENTOR.
KARL V. KORDESCH
BY
ATTORNEY

INVENTOR.
KARL V. KORDESCH
ATTORNEY

United States Patent Office 3,247,452
Patented Apr. 19, 1966

3,247,452
GAS SENSING DEVICE WITH A GAS-DEPOLARIZABLE ELECTRODE
Karl V. Kordesch, Lakewood, Ohio, assignor to Union Carbide Corporation, a corporation of New York
Filed Aug. 10, 1964, Ser. No. 389,521
11 Claims. (Cl. 324—29)

This application is a continuation-in-part of my application U.S. Serial No. 60,112, filed on October 3, 1960, now abandoned.

This invention relates to a portable gas sensing device for determining the concentration of a given gas in gaseous mixtures. This device utilizes the principle of depolarization of an electrode by a gas to measure the gas concentration as a function of voltage or current changes produced by the depolarization.

While the present analyzer can be used, with suitable modifications, to determine the concentration of chlorine, nitrogen oxides, and hydrogen, the analyzer will be described mainly with reference to its use in the determination of oxygen.

Chemical methods of determining oxygen in gases, e.g., by absorption or combustion reactions, are well known, as are other methods which involve physical properties of oxygen such as heat of reaction and paramagnetism. With methods such as these, expensive and bulky instrumentation is usually involved, as well as attendant problems such as lack of selectivity for oxygen in complex gas mixtures and the difficulty or arranging automatic control.

In U.S. Patent 2,991,412, issued on July 4, 1961, to K. Kordesch, there is disclosed and claimed an oxygen analyzer which uses an air-depolarizable oxygen measuring cell having a porous, activated and catalyzed carbon cathode exposed to the gaseous mixture under analysis. As a result of the depolarizing action of oxygen on this cathode, a measurable change in voltage or current output of the cell occurs which is detected by means of a suitable voltage or current measuring circuit connected to the cell and to a similar compensating cell supplied with a known concentration of oxygen. While the described device has many advantageous features, it requires repeated calibration because of temperature variations, barometric pressure changes and cell aging processes which do not simultaneously have identical effects on both the compensating and the measuring cell. Furthermore, these cells have to be closely matched with respect to the ability of their cathodes to be depolarized under loads of 10 to 100 ma./cm.² Differences in the anode capacity of the cells also affect the oxygen sensing accuracy of the device.

The main object of this invention accordingly is to provide a gas determining instrument characterized by great simplicity of construction and operation, but nevertheless capable of furnishing highly reproducible results over a wide range of concentrations.

Another object of the invention is to provide an instrument of the character described, which can be easily and rapidly calibrated.

It is a further object of this invention to provide a gas analyzer that does not require repeated calibration.

A still further object of the invention is to provide a portable oxygen analyzing instrument easily adaptable to semi-automatic and recording devices.

These and other objects and features of the present invention will be more readily apparent as the description thereof proceeds, especially when examined in conjunction with the accompanying drawings in which:

FIGURE 1 is a side cross-sectional view of the sensing element for the preferred embodiment of the invention.

FIGURE 2 is a cross-sectional end view of the element shown in FIGURE 1.

FIGURE 4 is a schematic circuit diagram for one version of the invention.

FIGURES 5, 6 and 7 are schematic circuit diagrams for other versions of the invention.

Figure 3:
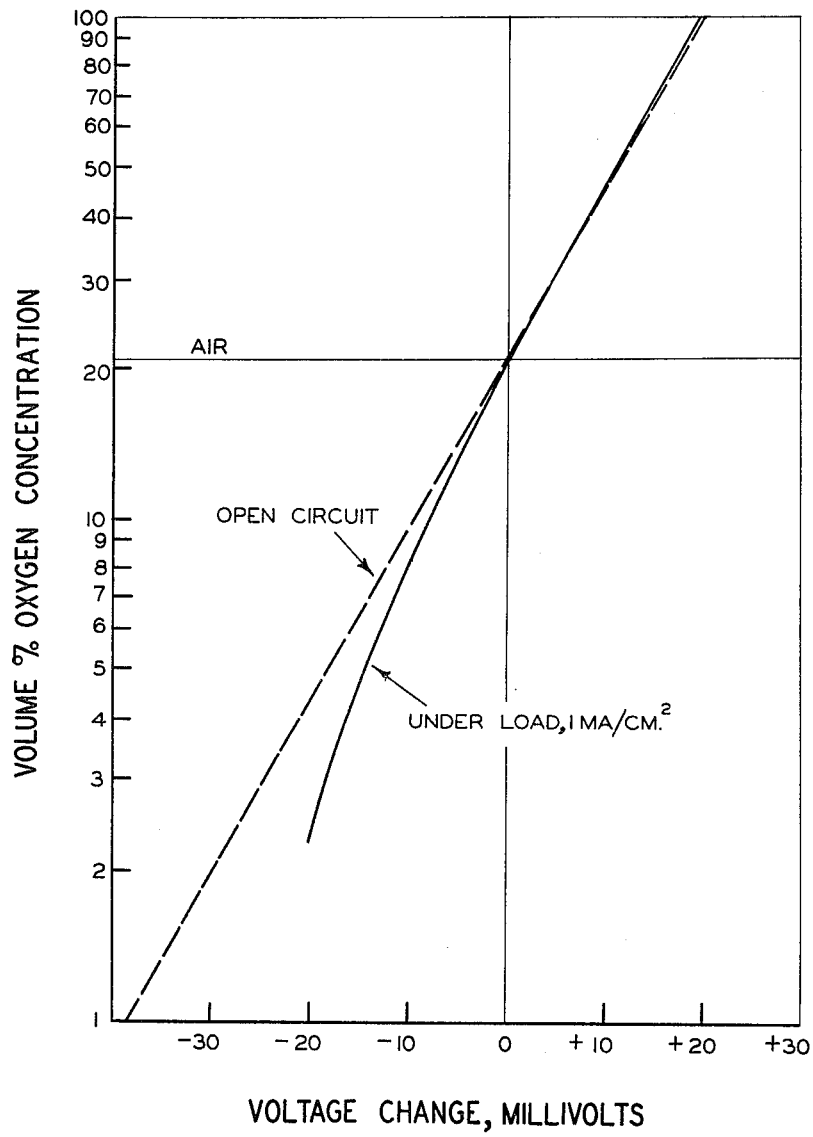
FIGURE 3 is a graph, the curves of which show the open circuit voltage and voltage under load of the sensing element.

The disadvantages of the earlier gas-sensing devices are overcome by the present invention which comprises a biasing electrode, at least one gas-depolarizable electrode, and an electrode of the same polarity as the gas-depolarizable electrode with respect to the biasing electrode, all immersed in an electrolyte contained in a suitable container. A gas-depolarizable electrode in conjunction with the biasing electrode and the electrolyte forms a measuring cell and the other electrode of the same polarity as the gas-depolarizable electrode forms a compensating cell in conjunction with the biasing electrode and the electrolyte.

In a preferred embodiment, the gas sensing device of this invention employs a single unit arrangement of three electrodes, to wit, two gas-depolarizable electrodes, a single biasing electrode, and a common electrolyte which can be either alkaline or acidic, in contact with all three electrodes. The biasing electrode is of opposite polarity to the gas-depolarizable electrodes and can be either a cathode or an anode depending on whether the gas-depolarizable electrodes serve as anodes or cathodes, respectively.

An example of this construction suitable for the determination of oxygen is shown in FIGURE 1. A gas- and liquid-impermeable, electrically non-conductive plug seals the inside end of both carbon tubes and the opposite ends are then left open to be exposed during calibration to a standard reference gas containing a known amount of oxygen (e.g., air) and to the unknown gas mixture during measurement. Since the biasing electrode, in this instance serving as the anode, and the electrolyte are common to both oxygen-depolarizable cathodes, there is no longer a need for repeated zero calibration settings because of changes in electrolyte as the cell ages or because of pressure and temperature changes. Barometric pressure changes act on both oxygen-depolarizable cathodes simultaneously, as do temperature variations and, thus, no longer affect the sensitivity of the analyzer. In fact, the device may be used to determine oxygen concentration at various depths or altitudes without further adjustments.

As shown, the device of FIGURE 1 comprises a generally cylindrical plastic container 8 with two open-ended gas-depolarizable cathodes 10 and 12 which are axially aligned but separated by means of gas- and liquid-impermeable, electrically non-conductive plugs 14, suitably composed of epoxy resin, which seal their ends. Fitting around the two cathodes is biasing electrode 16 which serves as an annode for both cathodes 10 and 12. Intermediate the anode and each cathode is an inert metallic electrode 18, for use in recharging the biasing electrode or the anode. On both sides of this electrode are positioned plastic spacer screens 20 and 22, which serve to separate anode and cathode from the inert metal electrode, and contact the anode and cathodes, respectively.

Container 8 may have a side opening 24 for introducing alkaline electrolyte 26, after assembly of the element. The electrolyte is suitable potassium hydroxide gelled with with a suitable gelling agent such as sodium carboxymethyl cellulose or starch. Alternatively, the electrolyte can be acidic such as an aqueous solution of zinc chloride gelled with corn starch, for example. Of course, the selected electrolyte must be compatible with all components of the device and should not react with or dissolve the electrodes. A rubber vent cap 28 fits over the opening and may be removed to permit the escape of gases produced upon charging the anode. If it is desired to omit means for recharging the anode, the opening for gas escape will not be needed. Electrolyte may be introduced during assembly of the device.

As was true of the earlier oxygen analyzer, the cathodes of the above-described oxygen sensing cell, when operating in an alkaline electrolyte, form reversible $H_2O_2$ electrodes, the electromotive force of which is a function of the partial pressure of oxygen in the gas mixture diffusing to the cathode electrolyte interface. When this electrode is operated under a small load (e.g., 1 ma./cm.$^2$) sufficient to guarantee reasonable speed of gas diffusion through the gas-deplorizable electrode so that a rapid equilibrium is attained during measurement, the electrode potential follows the Nernst equation very closely in the range of 10 to 100 percent $O_2$. Under these conditions, the voltage change is expressed as:

$$\Delta V = 0.029 \log \frac{P_2}{P_1}$$

that is, for each tenfold change in oxygen pressure, the observed change in voltage is approximately 29 millivolts. This relationship is illustrated in the graph in FIGURE 3, where open circuit voltage behavior is also illustrated.

The gas-depolarizable electrodes conventionally are made from porous carbon, treated prior to incorporation in the device so that the electrode contains within its pores and at its surface a spinel-type catalyst consisting of an oxide of a heavy metal and of aluminum oxide. The potential of such an electrode supplied with air and measured against a cadmium electrode in 6N KOH is 0.85 volt under a 1 ma./cm.$^2$ load. The potential vs. a zinc electrode under the same conditions is 1.35 volts.

The carbon cathode is a very important component of the gas-depolarizable cell. The activation, porosity, etc., of the cathode govern its voltage sensitivity, and the thickness of the cathode is a factor in determining the response time. The cathode is usually extruded in a tubular form, followed by various heat and atmospheric treatments which produce the desired structure and electrochemical activity.

The cathodes used in the cells of this invention can be prepared from a mixture consisting of about 60 percent by weight of projector-type carbon, about 40 percent by weight of soft pitch and about 1½ percent by weight of fuel oil. If desired, suitable plastic binders may be substituted for the pitch and fuel oil and the amount of binder adjusted accordingly. Cathodes having the desired dimensions are extruded or molded from such a mix and baked at 1000° C. for about 6 hours. After this baking, the cathodes have a porosity of from about 20 to about 33 percent, using water saturation method measurement. The cathodes are next heated in a $CO_2$ atmosphere between 850° C. to 950° C. for two hours to convert their hard and shiny skin to a surface having a dark black apperance. In this condition the carbon cathodes are better able to absorb the catalyzing solution in which they will be immersed. Such a solution consists of an 0.1 molar solution of aluminum nitrate and cobalt nitrate containing 75 grams

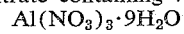
$Al(NO_3)_3 \cdot 9H_2O$ and 29 grams $Co(NO_3)_2 \cdot 6H_2O$ per liter. Generally, one carbon cathode of approximately 10 square centimeter surface area requires about 1.5 ml. of solution. Good results have been obtained by placing the carbon dioxide-treated carbon cathodes, once cooled, in a container which is then evacuated. After obtaining a vacuum of about 20 millimeters of mercury, the catalyzinz solution is allowed to enter the container, and to soak the electrodes. Upon restoring the air pressure, the solution is pressed into the pores of the cathodes. The cathodes are then dried at about 100° C. for two hours, and heated again to about 850° C. for two hours in carbon dioxide to decompose the metal nitrates to oxides. After this treatment a spinel of the formula $CoO \cdot Al_2O_3$ is formed from the catalyst mixture. The deposit is observable on the surface of the carbon cathodes as a blue deposit. After cooling the carbon cathodes in a carbon dioxide atmosphere, the vacuum operating and heating cycles are repeated to increase the activity of the carbon surface. In some instances the spinel catalyst may be omitted, provided the electrode surface area is properly developed.

Optionally, the cathodes can be further treated with a noble metal catalyst such as platinum. This can be accomplished by painting on the carbon cathode surface an aqueous solution containing about 10 percent of chloroplatinic acid ($H_2PtCl_6 \cdot 6H_2O$). This compound, when deposited on the cathode surface, is thermally decomposed by conventional methods so as to yield a catalytically active noble metal. The noble metal catalyst is deposited on the cathodes when it is desired to increase the voltage and load capability of the cell. The amount employed is dependent on the desired output characteristics of the cell.

It is also desirable to wetproof the carbon cathodes. This can be achieved by immersing the electrodes in a paraffin-petroleum ether solution (the paraffin concentration can be as high as about 2 weight percent, or as low as about 0.5 weight percent) for about five minutes. Following this, the electrodes are air-dried. Wet-proofing aids in reducing polarization off the cathode, but too much wet-proofing is detrimental to cathode life, in that it adversely affects the load capability of the cell by decreasing the available electrode surface area.

Other wet-proofing agents can be used in addition to paraffin and petroleum ether. Thus, chloronaphthalene and dibenzylether may be used.

The anode used in the cell of FIGURE 1 may be either cadmium or zinc. A high surface area, amalgamated powdered zinc electrode containing gel and electrolyte may be effectively employed as a highly conductive, non-polarizing electrode. A high surface area, powdered cadmium anode, preferably fiber bonded, is suitable and somewhat more desirable than a zinc anode because of its more insoluble nature in alkaline electrolyte. Both the cadmium and zinc anodes may be recharged, if desired. For this purpose, an electrode of a metal such as nickel or stainless steel which is inert in the electrolyte may be provided between and separated from the central carbon cathodes and the coaxial zinc, or cadmium anode. It is desirable that this electrode contain openings so that gas formed on charging can be properly vented. A suitable form may consist of a screen or a perforated metal sheet. When a cadmium anode is employed, the inert metal electrode is separated from its neighbor electrode on either side by a simple open mesh non-conductive barrier such as a plastic screen. No additional separator is needed. When a zinc anode is employed, there must be a semi-permeable membrane separator between the zinc electrodes and the nickel screen in order to prevent "tree" formation on recharging. Any of the commonly employed alkaline-resistant separator materials such as regenerated cellulose are satisfactory.

As set forth above, the electrolyte can be either acidic or alkaline, and can be a liquid or a gel. Typical electrolytes are aqueous solutions of potassium hydroxide, sodium hydroxide, ammonium chloride, zinc chloride, and the like. The particular electrolyte concentration is normally dependent on the conductivity and the activity desired. Normally, the concentration of alkaline electrolytes is in the range from about 6 N to about 12 N. For acid electrolytes, the pH of the electrolyte may range from about 2 to about 6.

Alkaline electrolytes can be advantageously employed in instances where carbon dioxide contamination is not a problem; however, acidic electrolytes are often preferred because cells employing an acidic electrolyte are substantially less sensitive to carbon dioxide. Moreover, the latter cells are about twice as sensitive to changes in oxygen concentration as compared to those employing alkaline electrolytes. The response time of an acidic cell is somewhat greater than that of an alkaline cell, yet in both instances the response times are satisfactory for many uses.

FIGURE 4 illustrates a simple circuit for use with the above-described cell in an oxygen analyzer. The optional charging circuit is also shown incorporated therein to be connected to an external voltage supply (not shown) when it becomes necessary to insure freshness of the metal anode. Two fixed resistors 30, 32 of suitable rating (e.g., 50 ohms), each connected in series with an oxygen depolarizable cathode and the biasing electrode 16 serve to apply a very small load on the oxygen-depolarizable electrodes when switch S is closed. A variable resistor 34, of suitable rating (e.g., 50 ohms) is connected with the slide contact to the cell and serves as a zero adjustment in initial calibration of the cell by means of a suitable voltmeter or galvanometer. Calibration is done simply by exposing both cathodes to air or some other gas having a known oxygen content and setting the voltmeter at zero or some other selected reference point. Either of the two cathodes may be selected as the one into which the gaseous mixture to be analyzed is subsequently passed. The other cathode is closed to the unknown gaseous atmosphere either by plugging the open end thereof with a gas-impermeable plug or by maintaining contact of this electrode only with the known atmosphere, e.g., a cylinder oxygen supply. The percentage of oxygen present in the unknown gaseous mixture can be read on the voltmeter (or a suitable recorder) which has been previously calibrated to read directly in percent oxygen.

The above-described analyzer is most sensitive to atmospheres wherein the oxygen content is between 10 percent and 100 percent. Below a 10-percent range, the observed voltage change in the cell on constant load no longer follows the log relationship as is shown in FIGURE 3. The open circuit potential of the cell is a useful indication over the entire concentration range; however, gas diffusion is too slow under a zero load condition.

Typical performance data for an analyzer containing the two carbon cathodes and a cadmium anode under constant load conditions (1 ma./cm.$^2$) are the following:

*Stability of zero setting.*—Not more than ±0.2 mv. drift in 8 hours.

$O_2$ *sensitivity of system.*—+20 mv. potential change from air to pure $O_2$. —9 mv. potential change from air to 10% $O_2$. Another example of such device but utilizing a zinc anode was constructed and showed the same performance as the above analyzer.

A modification of the above-described analyzers can be made so as to permit sensitive operation in the range of less than 10 percent oxygen by measuring change in current rather than voltage. Such a device employs the cell construction shown in FIGURES 1 and 2, but with a modified circuit such as that shown in FIGURE 5. (The charging circuit has been omitted here but may be included if desired.) Operation of the device is accomplished in the following manner: To calibrate the instrument, air is blown into the carbon cathodes and the milliammeter is set to the air reference point (20 percent oxygen) on its scale by means of a variable resistor 36 of suitable rating, e.g., 50 ohms full scale. Voltmeter V now shows a certain deflection which is established as a reference point for later oxygen measurements. The two fixed resistors 30, 32 (e.g., 50 ohms) are employed to apply a small load to each carbon electrode. To measure percent oxygen in a gaseous mixture, the gas is blown into that carbon electrode in series with the milliammeter (shown on the left side of the diagram). The variable resistor is then adjusted until the voltmeter reaches the reference point established during calibration. The oxygen concentration of the gas can then be determined from the milliammeter which is desirably calibrated to read directly in percent oxygen. If desired, the milliammeter may be the multiple scale type with one scale for 0 to 1 percent oxygen, another for 1 to 10 percent, and a third for 10 to 100 percent. An analyzer constructed in this manner will have a sensitivity of ±½ percent in the range of 10 to 100 percent oxygen, ±0.1 percent between 1 to 10 percent oxygen and ±0.01 percent below 0.01 percent oxygen.

Another modification of the subject invention involves the replacement of one of the carbon cathodes with a reference electrode 38, composed substantially of a material such as CuO, HgO, or the partially reduced oxides of nickel or manganese (together with graphite and a suitable binder if necessary) whose voltage against the gas-depolarizable electrode is substantially zero volts, and the polarity of both the gas-depolarizable electrode and the reference electrode is the same with respect to the biasing electrode. When the oxygen content in the depolarizing atmosphere changes, a voltage change can be observed between this electrode and the gas-depolarizable electrode. This is a very sensitive measure of oxygen content. Since CuO and HgO are slightly soluble in an acidic electrolyte, the use of an alkaline electrolyte in this particular embodiment is preferred. The circuit shown in FIGURE 6 may be employed with this cell arrangement. Two small fixed resistors of any suitable rating, e.g., 50 ohms, are included in the circuit, one of which, 32, serves to apply a small load to the carbon cathode and the other, 30, to apply a similar load to the reference electrode. The latter permits greater speed of response by promoting rapid establishment of equilibrium in the "zero voltage cell," i.e., the reference electrode vs. the carbon electrode. When the cell is calibrated by permitting air access to the carbon cathode, the voltmeter is set at some selected reference point. An optional variable resistor for zero adjustment may be provided but is not shown in FIGURE 6.

When the oxygen-depolarizable carbon electrode is subsequently exposed to the unknown gaseous mixture containing oxygen, the voltage difference in percent oxygen can be read from the previously calibrated voltameter V. An optional charging circuit and inert metal reference electrode for charging the zinc or cadmium electrode is also shown here. This analyzer is most useful in the range of 10 to 100 percent oxygen and has a sensitivity of ±0.5 percent.

A further modification of the subject invention is illustrated in FIGURE 7 wherein a metal biasing electrode serving as the anode, a carbon cathode, and a third electrode 38 of CuO, HgO, or partially reduced oxides of nickel or manganese are employed. A voltmeter is employed to establish a constant reference point between the carbon and oxide reference electrodes while the carbon electrode is in contact with air or other reference gas. A milliammeter is situated in series with a fixed resistor (50 ohms) 30, the oxygen-sensing carbon electrode and the zinc or cadmium anode and records current flow as percent $O_2$ when the unknown gaseous mixture contacts the carbon electrode. The sensitivity of this device is comparable with that illustrated in FIGURE 5. Both devices are useful in the range of 0.01 to 100 percent oxygen. A charging circuit and an inert metal electrode are not shown here but may be included to charge the zinc or cadmium electrode, if desired.

Still a further modification of the subject invention is obtained by substituting a zinc or cadmium reference electrode for the CuO, HgO, or partially reduced nickel or manganese oxide electrode illustrated in the circuit in FIGURE 7. The milliammeter may be omitted from the circuit and a voltmeter used to record percent oxygen as a change in voltage. If it is desired to include a charging circuit as described earlier, only that metal anode used to load the carbon cathode would be recharged.

In the above-described devices in which changing current is measured, it becomes necessary to compensate for increasing internal resistance of the oxygen-depolarizable cathode-metal anode cell at high currents. Thus, to improve the accuracy and sensitivity of such analyzers to gaseous mixtures of high oxygen content, a pulse-current circuit similar to that described in U.S. Patent 2,991,412 issued on July 4, 1961, to K. Kordesch is employed to effectively eliminate the internal cell resistance. This circuit is preferably employed in conjunction with the arrangement illustrated in FIGURE 5, but can be used also with that in FIGURE 7.

Certain limitations of the earlier analyzer also are applicable to the subject analyzer. Other gases which also have a depolarizing action on the carbon electrode (e.g., $Cl_2$ or nitrogen oxide) will interfere with the proper functioning of the instrument. Also, organic impurities in concentrations great enough to be adsorbed on and block the carbon surface may cause errors in measurement.

It should be pointed out also here, that the operation of the subject analyzer is completely independent of external pressure variations only where there are two gas-depolarizable electrodes in the cell. In the modified versions using a CuO, HgO, partially reduced oxide of manganese or nickel, or a metal electrode in place of one of the gas-depolarizable electrodes as illustrated in FIGURES 6 and 7, barometric pressure variations do affect the device, and recalibration after pressure changes becomes necessary. However, a device modified in this manner remains unaffected by other factors such as temperature and electrolyte concentration changes and does not require recalibration under those circumstances.

Among structural modifications of the subject instrument are variations in electrode shape and form as well as variations in the size of the tubular electrodes. Thus, the electrodes may be so constructed so that the outer surface of the gas-depolarizable electrode is exposed to the atmosphere and the electrolyte and the metal biasing electrode are positioned within the interior of the gas-depolarizable electrode.

A modified device made according to the subject invention can be utilized to determine the concentration of other depolarizing substances, in the absence of oxygen. In addition to the analysis of other oxidizing gases such as chlorine and oxides of nitrogen, a device can be constructed to determine the hydrogen content of vapors or liquids of substances capable of undergoing hydrogen ion-producing reactions, for example, gaseous hydrogen and methanol (liquid or vapor). The response of this device is a function of the ionizable hydrogen content of the substance being analyzed.

In constructing such a three-electrode device, the pair of gas-depolarizable carbon electrodes function as anodes and are provided with hydrogen ionization catalysts on the surfaces adjacent to the electrolyte. The biasing electrode in this device, in this instance the cathode, may suitably be a Zn/ZnO, $Cd/Cd(OH)_2$, or $MnO_2$ electrode. The $Cd/Cd(OH)_2$ is preferred. The potential of a hydrogen electrode vs. a $Cd/Cd(OH)_2$ electrode in alkaline electrolyte is about 0.2 volt under a small current load. If a recharging circuit is desired, the same inert metal electrode (e.g., nickel), as described for the oxygen analyzer, may be used. The plus and minus signs in the illustrated circuits are, of course, reversed in this embodiment.

A "low voltage cell" construction can also be constructed by utilizing as the reference electrode a substance whose voltage is near to the potential of the hydrogen electrode such as calomel or cadmium. The latter is preferred.

With the exceptions noted above, this device may be constructed and operated in the same manner as described for the oxygen analyzer. Hydrogen gas is suitable for calibration of the device. Those circuits and arrangement of electrodes shown in FIGURES 1–7 can be used, provided the anode-cathode relationship is *reversed*. Either changes in voltage or changes in current with varying hydrogen concentration can be measured.

I claim:
1. A gas-sensing device which comprises a container, an electrolyte within said container, a biasing electrode, at least one gas-depolarizable, porous, catalyzed, activated carbon electrode, and an electrode of the same polarity, with respect to the biasing electrode, as the gas-depolarizable electrode, all in electrochemical contact with said electrolyte and one side of the gas-depolarizable electrode being exposed to a depolarizing gas; said gas-depolarizable electrode being electrically connected to and forming a measuring cell in conjunction with said biasing electrode and said electrolyte, and the other electrode of the same polarity as the gas-depolarizable electrode being electrically connected to and forming a compensating cell in conjunction with said biasing electrode and said electrolyte.

2. A gas-sensing device which comprises a container, an electrolyte within said container, a biasing electrode, at least one gas-depolarizable, porous, catalyzed, activated carbon electrode, an electrode of the same polarity, with respect to the biasing electrode, as the gas-depolarizable electrode, and an inert metallic electrode intermediate the biasing electrode and the electrodes of the same polarity, all in electrochemical contact with said electrolyte and one side of the gas-depolarizable electrode being exposed to a depolarizing gas; said gas-depolarizable electrode being electrically connected to and forming a measuring cell in conjunction with said biasing electrode and said electrolyte, and the other electrode of the same polarity as the gas-depolarizable electrode being electrically connected to and forming a compensating cell in conjunction with said biasing electrode and said electrolyte.

3. A gas-sensing device which comprise a container, an electrolyte within said container, a biasing electrode, and a pair of gas-depolarizable, porous, catalyzed, activated carbon electrodes in electrochemical contact with said electrolyte and having one side exposed to a depolarizing gas; one of said depolarizable electrodes being electrically connected to and forming a measuring cell in conjunction with said biasing electrode and said electrolyte, and another of said gas-depolarizable electrodes being electrically connected to and forming a compensating cell in conjunction with said biasing electrode and said electrolyte.

4. A gas analyzer comprising a single container and within said container a pair of gas-depolarizable, porous, catalyzed, activated carbon cathodes, a common anode, a common electrolyte for said cathodes and said anode; an external resistive load connected between each cathode and said anode; the cathodes being situated so that one side of each cathode is exposed to a depolarizing gas; and means for measuring the potential difference of said cathodes electrically connected across said cathodes.

5. A gas analyzer comprising a container and a pair of gas-depolarizable, porous, catalyzed, activated carbon cathodes situated so that one side of each cathode is exposed to a depolarizing gas, a common anode, a common electrolyte for said cathodes and said anode in said container; an external resistive load connected between each cathode and said anode, and means for measuring the flow of current between one of said cathodes and said anode connected in series with the respective resistive load.

6. An oxygen analyzer comprising a container and within said container, a pair of oxygen-depolarizable cathodes, a common anode, a common electrolyte for said cathodes and said anode, an inert metallic electrode intermediate said cathodes and said anode and immersed in said electrolyte; an external resistive load connected between each cathode and said anode; the cathodes being situated so that one side of each cathode is exposed to an oxygen-containing gas; and means for measuring the potential difference of said cathodes electrically connected across said cathodes.

7. An oxygen-analyzer in accordance with claim 6 wherein said cathodes are activated and catalyzed carbon, and said anode is selected from the group consisting of cadmium and zinc.

8. A gas-sensing device which comprises a container, an electrolyte within said container, a biasing electrode, at least one gas-depolarizable, porous, catalyzed, activated carbon electrode situated so that one side of the electrode is exposed to an oxygen-containing gas, and an electrode of the same polarity, with respect to the biasing electrode, as the gas-depolarizable, porous, catalyzed, activated carbon electrode and whose voltage against the gas-depolarizable electrode is substantially zero, all in electrochemical contact with said electrolyte; said gas-depolarizable electrode being electrically connected to and forming a measuring cell in conjunction with said biasing electrode and said electrolyte, and the other electrode of the same polarity as the gas-depolarizable electrode being electrically connected to and forming a compensating cell in conjunction with said biasing electrode and said electrolyte.

9. A gas analyzer comprising a container and within said container, a pair of solid cathodes at least one of which is an oxygen-depolarizable, porous, catalyzed, activated carbon cathode a common anode for said cathodes, and an electrolyte maintaining electrolytic contact between said cathodes and said anode within the container; an external resistive load connected between the oxygen-depolarizable cathode and the common anode; and means for measuring the potential difference of the cathodes connected therebetween; said one side of said oxygen-depolarizable cathode being exposed to an oxygen-containing gas and forming a measuring cell in conjunction with said anode and the other of said cathodes being electrically connected to and forming a compensating cell in conjunction with said anode; said other solid cathode being selected from the group consisting of activated and catalyzed carbon, cupric oxide, mercuric oxide, partially reduced oxide of nickel, and partially reduced oxide of manganese.

10. A gas analyzer comprising a container, an oxygen-depolarizable, porous, catalyzed, activated carbon cathode situated so that one side of the cathode is exposed to an oxygen-containing gas, a zinc reference electrode, a common biasing electrode for both the oxygen-depolarizable carbon cathode and the zinc reference electrode, and an electrolyte maintaining electrolytic contact between the electrodes within the container; an external resistive load connected between the oxygen-depolarizable carbon cathode and the biasing electrode; and means for measuring the potential difference between the oxygen-depolarizable carbon cathode and the zinc reference electrode connected therebetween; said oxygen-depolarizable cathode forming a measuring cell in conjunction with the biasing electrode and said reference electrode being electrically connected to and forming a compensating cell in conjunction with the biasing electrode.

11. A gas analyzer comprising a container, an oxygen-depolarizable, porous, catalyzed, activated carbon cathode situated so that one side of the cathode is exposed to an oxygen-containing gas, a cadmium reference electrode, a common biasing electrode for both the oxygen-depolarizable carbon cathode and the cadmium reference electrode, and an electrolyte maintaining electrolytic contact between the electrodes within the container; an external resistive load connected between the oxygen-depolarizable carbon cathode and the biasing electrode; and means for measuring the potential difference between the oxygen-depolarizable carbon cathode and the cadmium reference electrode connected therebetween; said oxygen-depolarizable cathode forming a measuring cell in conjunction with the biasing electrode and said reference electrode being electrically connected to and forming a compensating cell in conjunction with the biasing electrode.

References Cited by the Examiner
UNITED STATES PATENTS

| | | | |
|---|---|---|---|
| 1,426,868 | 8/1922 | Haskins | 324—29.5 |
| 2,229,036 | 1/1941 | Bird et al. | 324—30 X |
| 2,805,191 | 9/1957 | Hersch | 204—1 |
| 2,873,236 | 2/1959 | Ferris | 324—30 |
| 2,898,282 | 8/1959 | Flook et al. | |
| 2,988,590 | 6/1961 | Andre | 324—29.5 X |
| 3,043,898 | 7/1962 | Miller et al. | 136—86 |
| 3,061,773 | 10/1962 | Ellison et al. | 324—30 |
| 3,103,481 | 9/1963 | Robinson. | |

FREDERICK M. STRADER, *Primary Examiner.*
WALTER L. CARLSON, *Examiner.*